United States Patent [19]
Kudou

[11] Patent Number: 5,329,477
[45] Date of Patent: Jul. 12, 1994

[54] ADDER CIRCUIT HAVING CARRY SIGNAL INITIALIZING CIRCUIT

[75] Inventor: Tsuneaki Kudou, Yokohama, Japan

[73] Assignee: Kabushiki Kaisha Toshiba, Kawasaki, Japan

[21] Appl. No.: 943,561

[22] Filed: Sep. 11, 1992

[30] Foreign Application Priority Data

Sep. 11, 1991 [JP] Japan ................................ 3-231520

[51] Int. Cl.[5] .................................................. G06F 7/50
[52] U.S. Cl. .................................... 364/786; 364/787
[58] Field of Search ............................ 364/786, 787

[56] References Cited

U.S. PATENT DOCUMENTS 4,807,176  2/1989  Yamada et al. ..................... 364/786
4,899,305  2/1990  Needles ............................... 364/787
5,128,892  7/1992  Ullrich ................................. 364/786

*Primary Examiner*—David H. Malzahn
*Attorney, Agent, or Firm*—Oblon, Spivak, McClelland, Maier & Neustadt

[57] ABSTRACT

Disclosed herein is an adder which comprises a Manchester-type adder circuit and which can operate as fast as a dynamic adder, and can perform addition during the clock cycle as a static dynamic adder. Hence, the adder serves to increase the operating frequency of the system in which it is incorporated. The adder further comprises two initializing signal output circuits, each designed to generate an initializing signal in response to predetermined data supplied before the Manchester-type adder circuit starts performing each operation, thereby to initialize the Manchester-type adder circuit.

3 Claims, 9 Drawing Sheets

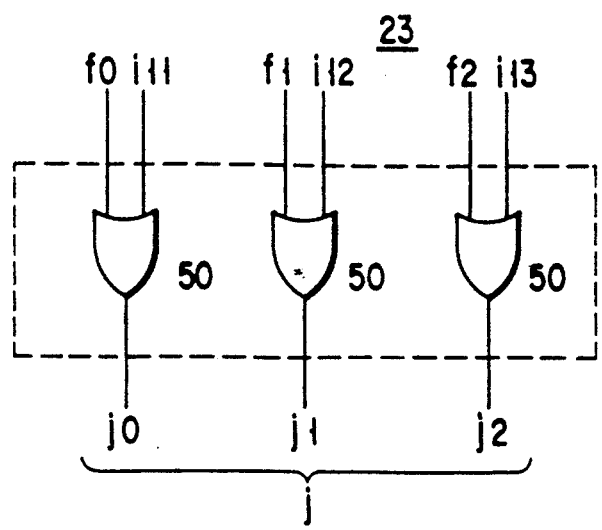
F I G. 8
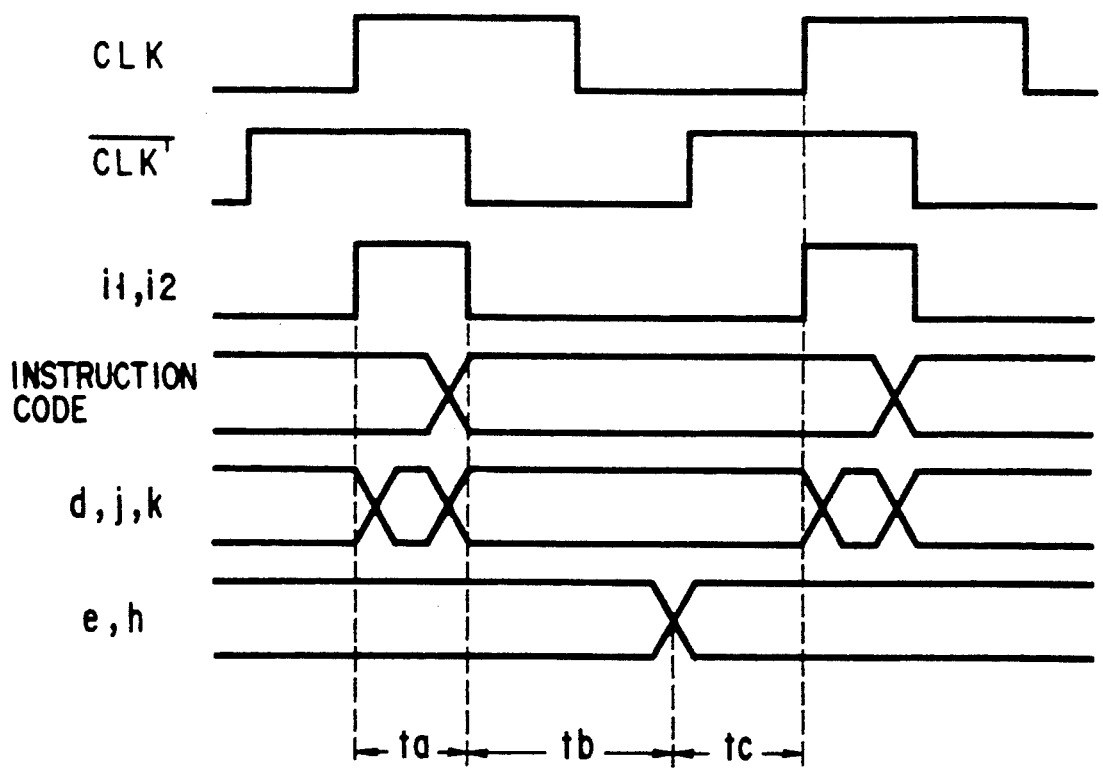
F I G. 9

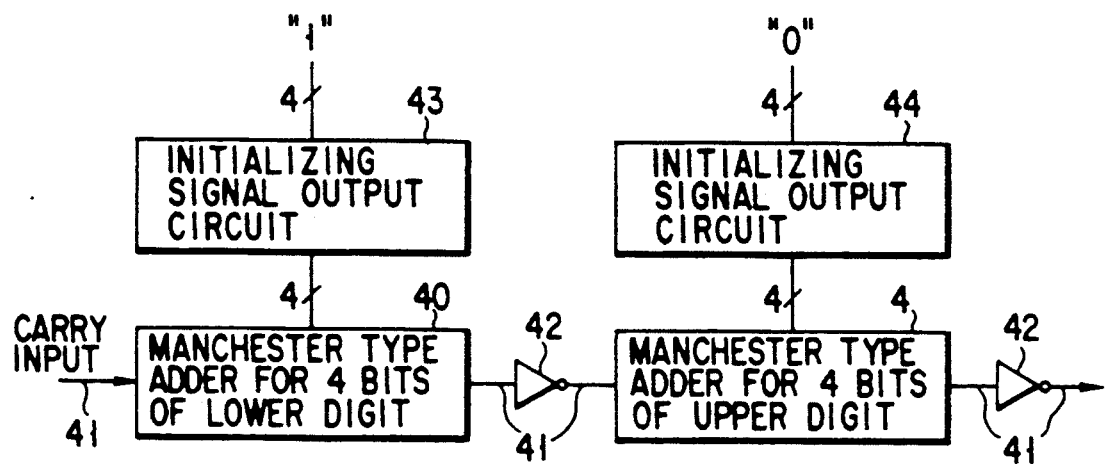
F I G. 12

ADDER CIRCUIT HAVING CARRY SIGNAL INITIALIZING CIRCUIT

BACKGROUND OF THE INVENTION

1. Field of the Invention

The present invention relates to an adder for use in a microprocessor which performs operations at high speed, and more particularly to an adder incorporating a Manchester type adder circuit.

2. Description of the Related Art

FIG. 1 is a block diagram showing a 3-bit adder designed for use in a microprocessor which needs to perform operations at high speed. The adder comprises a first shift register 11, a second shift register 12, an ALU (Arithmetic Logic Unit) 13, a third shift register 14, and an AND circuit 15. The first shift register 11 receives 3-bit first input data a. The second shift register 12 receives a 3-bit second input data b. The ALU 13 is a Manchester type adder circuit for receiving the data items f and g output from the shift registers 11 and 12, respectively. The third shift register 14 receives the data h output from the ALU 13. The AND circuit 15 is a two-input circuit for receiving a clock signal CLK and an operation control signal c. The output of the AND circuit 15 is input to the first shift register 11 and also to the second shift register 12. A carry input d is supplied to the ALU 13 from a lower-digit adder, (not shown) and a carry output e is supplied from the ALU 13 to a higher-digit adder (not shown).

FIG. 2 is a timing chart illustrating how the 3-bit adder of FIG. 1 performs static-type addition. In FIG. 2, ta is the decode period during which the adder decodes the operation control signal c, tb is the addition period during which the adder carries out addition, and tc is the setup period during which the third register 14 is set up to store the data h output by the ALU 13.

An addition-instructing code is decoded, rendering the operation control signal c active. At the leading edge of the clock signal CLK, the 3-bit data items f and g are input to the ALU 13 from the shift registers 11 and 12. The ALU performs addition during the period tb, which follows the code-decoding period ta. The result of the addition is stored into the third shift register 14 during the period tc. Hence, the period of ta +tb +tc elapses between the time the adder starts the addition and the time the result of the addition is stored into the third shift register 14.

FIG. 3 is a circuit diagram showing the ALU 13, or a static Manchester-type 3-bit adder 13. The 3-bit adder 13 comprises three adder circuits 70 used for performing addition of a first bit (f0, g0), a second bit (f1, g1) and a third bit (f2, g2) of input data f =(f0, f1, f2) and g =(g0, g1, g2). Each adder circuit 70 has a carrier line 71 and a bus transistor (i.e., a CMOS transfer gate) 72 which connects the carrier line 71 to the carrier line 71 of the immediately following adder circuit. Thus, the adder circuits 70 are connected in series.

Each of the adder circuits 70 further comprises a two-input NAND circuit 73, a two-input NOR circuit 74, a two-input exclusive NOR circuit 75, a two-input exclusive OR circuit 76, an inverter circuit 77, a P-channel transistor 78, and an N-channel transistor 79. The P-channel transistor 78 has its drain-source path connected between a power-supply potential node vcc and the carry line 71, and its gate connected to the output node of the NAND circuit 73. The N-channel transistor 79 has its drain-source path coupled between the carry line 71 and the ground potential node Vss, an its gate connected to the output node of the NOR circuit 74.

It will now be explained how the Manchester-type 3-bit adder (FIG. 3) operates. In the first adder circuit 70, for example, to which the first (f0, g0) of the three bits is input, the NOR circuit 74 outputs "1" when (f0, g0) =(0, 0) is input to the input terminals. The output of the NOR circuit 74 turns on the N-channel transistor 79 since the gate of this transistor 79 is connected to the output node of the NOR circuit 74. As a result, data "0" is output through the carry line 71, regard less of the value of the carry input to this adder circuit from the lower-digit adder circuit. When (f0, g0) =1, 1) is input to the input terminals, the NAND circuit 73 outputs "1". The output of the NAND circuit 73 turns on the p-channel transistor 78 since the gate of this transistor 78 is connected to the output node of the NAND circuit 73. Data "1" is thereby output through the carry line 71, regardless of the value of the carry input to this adder circuit from the lower-digit adder circuit. To the contrary, when (f0, g0) =(1, 0) or (f0, g0) =(0, 1) is input to the input terminals, the NOR circuit 74 outputs "0," whereas the NAND circuit 73 outputs "1." In this case, the N-channel transistor 79 connected to the output of the NOR circuit 74 is turned off, and the P-channel transistor 78 connected to the output of the NAND circuit 73 is turned off. As a result, the output of the exclusive NOR circuit 75 outputs "0." The CMOS transfer gate 72 is thereby turned on, whereby the carry, either "0" or "1", supplied from the lower-digit adder circuit is supplied to the higher-digit adder circuit through the carry line 71. In other words, the carry to the higher-digit adder circuit depends upon the carry supplied from the lower-digit adder circuit.

In the static Manchester-type adder circuit, the carry input from the lower-digit adder circuit is transferred to the upper-digit adder circuit in the case where (0, 1) or (1, 0) is input to the input terminals. Hence, the adder 13 operates at a low speed. If the first, second and third bits (f0, g0), (f1, g1) and (f2, g2) are (0, 1) or (1, 0), the adder 13 operates at the lowest speed. The number of data input to the adder circuits is the square of the number of bits of input data. The more the number of bits of input data, the lower the speed of the adder 13. It is desirable for high speed operation, the carry, whether "0" or "1," be fast transferred from a lower-digit adder circuit to the higher-digit adder circuit.

To increase the operating speed of the Manchester-type adder 13, the adder 13 may be modified into a dynamic one by transferring a carry of only one value, "0" or "1," from a lower-digit adder circuit to the higher-digit adder circuit, and by increasing the speed of the carry transfer. Such a dynamic Manchester-type adder circuit will be described, with reference to FIG. 4.

As is shown in FIG. 4, the dynamic Manchester-type adder circuit is characterized in that a P-channel transistor 80 pre-charges the carry line 71 of each adder circuit 70 to Vcc potential, whereby only a "0" carry is transferred from a lower-digit adder circuit to the higher-digit adder circuit. The P-channel transistor 80 has its source-drain path connected to the Vcc node and the carry line 71 of the third adder circuit 70, and its the gate connected to receive an inverted clock signal $\overline{CLK}$.

The dynamic adder shown in FIG. 4 can operate faster than the static adder shown in FIG. 3. However, its use in a system does not increase the operating frequency of the system as a whole. This is because the first half of the clock cycle is spend in pre-charging the the carry lines 71, and only the remaining half of the clock cycle is available for each adder circuit 70 to perform addition.

Due to the P-channel transistor 80, which is used to pre-charge the carry lines 71, the load of each carry line 71 is greater than in the static adder shown in FIG. 3. Obviously, a carry cannot be transferred so fast as desired. Further, in order to pre-charge the carry lines 71, additional hardware must be used, making each adder circuit 70 depend on the carry from the lower-digit adder circuit as in the case where (0, 1) or (1, 0) is input to the input terminals of the adder circuits 70. Due to the use of such additional hardware, the semiconductor chip on which the adder 13 is formed cannot help but have a large pattern area.

SUMMARY OF THE INVENTION

The object of the present invention is to provide an adder which can operate at as high a speed as a dynamic adder, and which can perform addition during the entire clock cycle to increase the operating frequency of a system in which it is incorporated.

According to the invention, there is provided an adder comprising a Manchester-type adder circuit including a plurality of adder circuits each having a two input terminals and a carry line connected in series to the carry line of any adjacent adder circuit, and an initializing signal output circuit for outputting an initializing signal for each of the adder circuits, upon receipt of a predetermined data before the adder performs each operation.

Since the adder is initialized before it performs each operation, it can perform the operation during the entire clock cycle as a static adder, increasing the operating frequency of the system incorporating the Manchester-type adder. Moreover, since it suffices to transfer a carry of only "0" or "1" from a lower-digit adder circuit to the higher-digit adder circuit, thus increasing the speed of transferring the carry, the Manchester-type adder operates as fast as a dynamic adder.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 8 is a diagram showing one of the two selection circuits 23 and 24 which are identical and used in the 3-bit adder of FIG. 5;

FIG. 9 is a timing chart explaining how the 3-bit adder shown in FIG. 5 operates;

FIG. 12 is a block diagram showing that part of another adder according to this invention, which differs from the corresponding part of the adder shown in FIG. 5.

DETAILED DESCRIPTION OF THE PREFERRED EMBODIMENTS

Embodiments of the present invention will be described in detail, with reference to the accompanying drawings.

Figure 5:
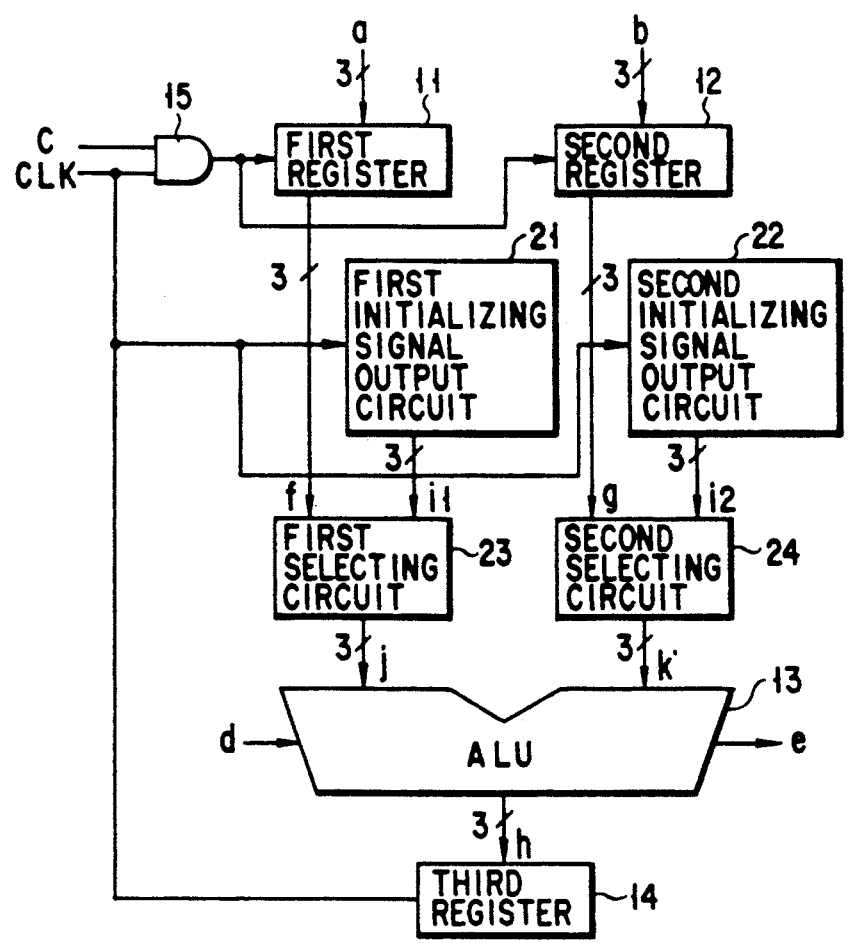
FIG. 5 is a block diagram showing a 3-bit adder according to an embodiment of this invention.

FIG. 5 is a block diagram showing a 3-bit adder according to the invention, which is designed for use in a microprocessor which needs to perform operations at high speed.

Figure 1:
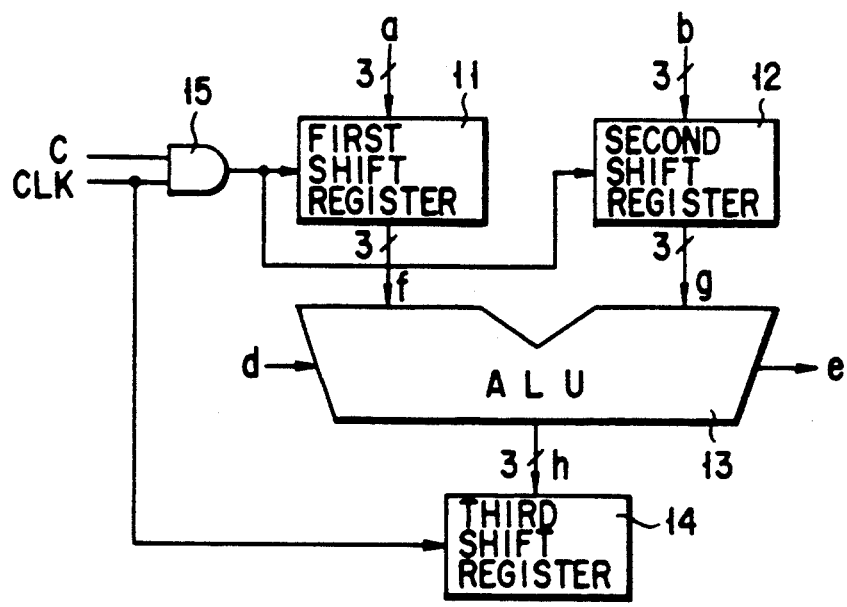
FIG. 1 is a block diagram showing a conventional 3-bit adder designed for use in a microprocessor.
Figure 2:
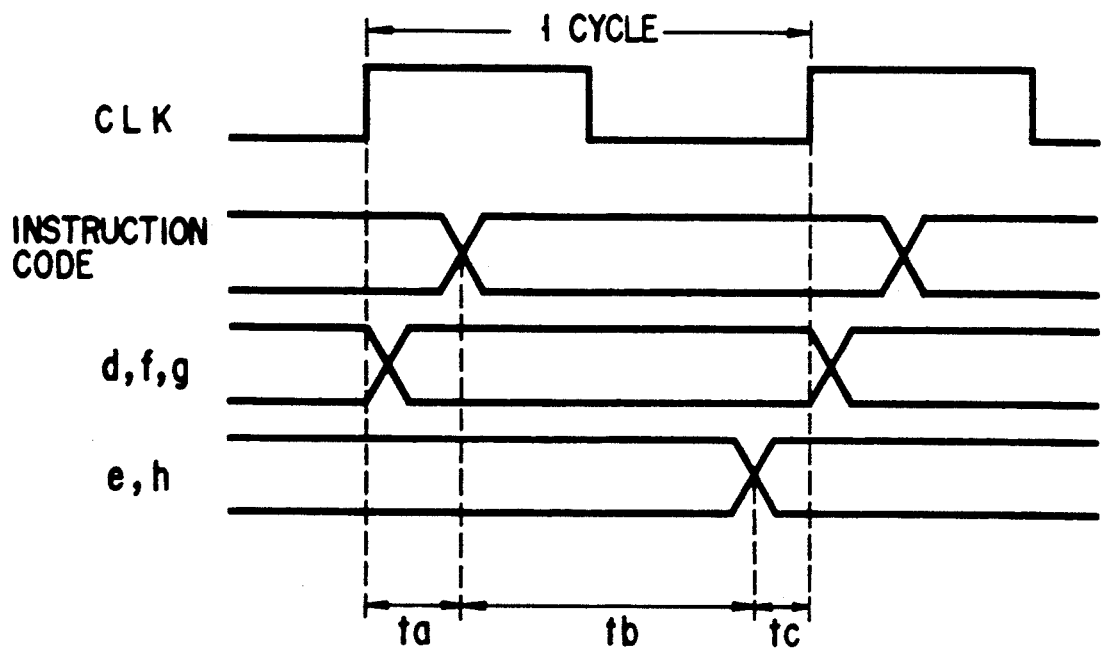
FIG. 2 is a timing chart illustrating how the adder of FIG. 1 performs addition.
Figure 3:
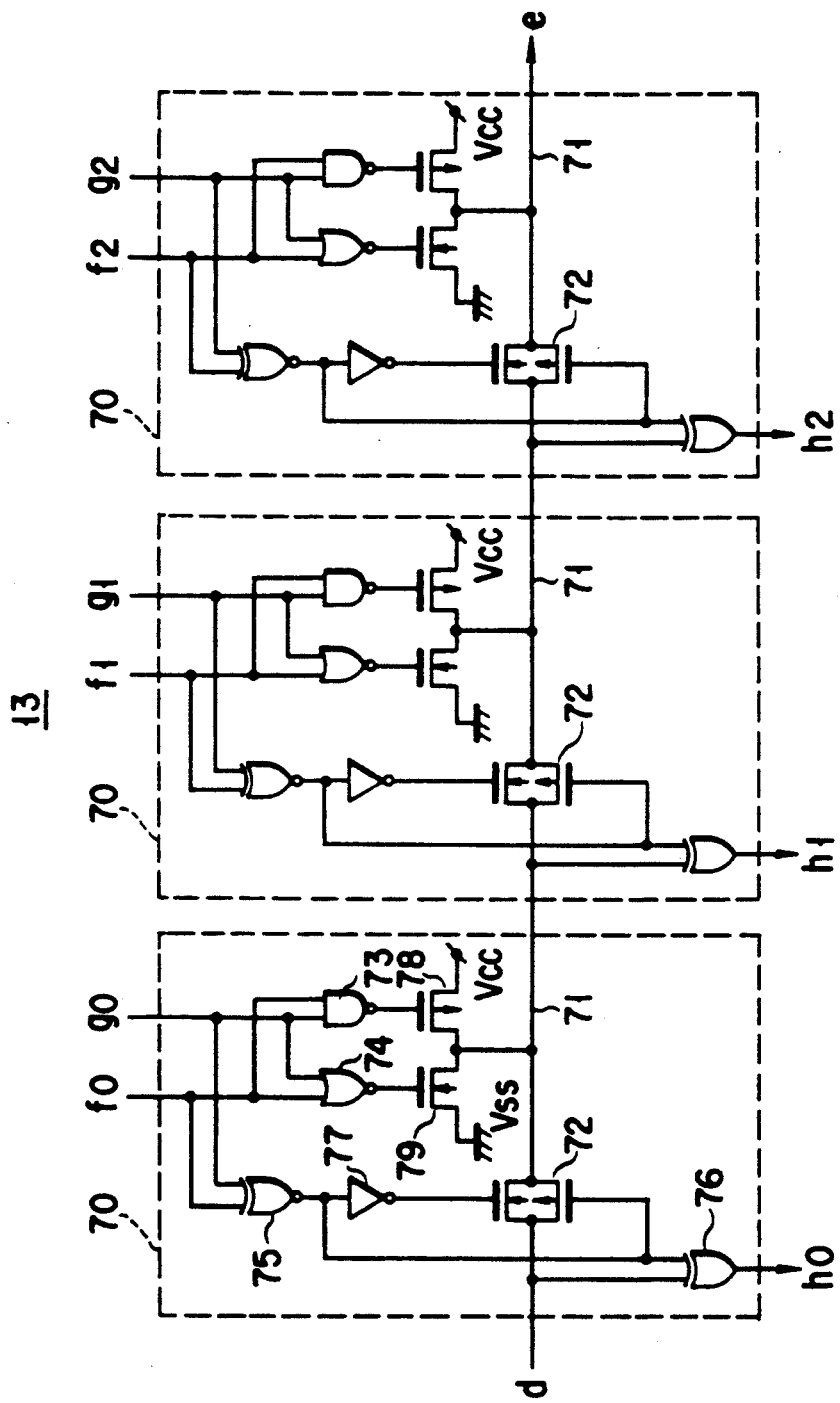
FIG. 3 is a circuit diagram showing the ALU 13 incorporated in the 3-bit adder of FIG. 1, which is a static Manchester-type adder circuit.
Figure 4:
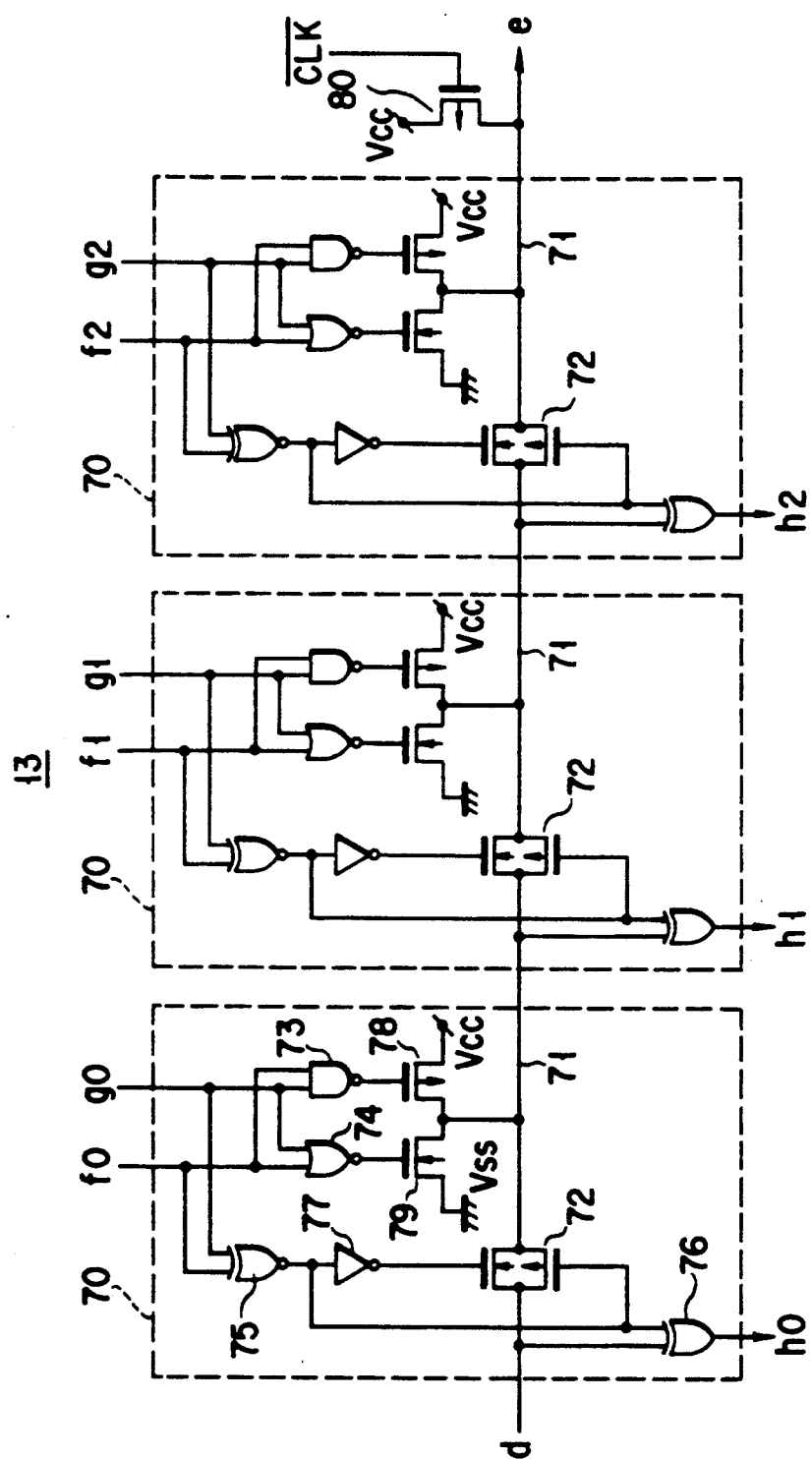
FIG. 4 is a circuit diagram showing a dynamic Manchester-type adder circuit which can be used as ALU 13 in the 3-bit adder device shown in FIG. 1.
Figure 6:
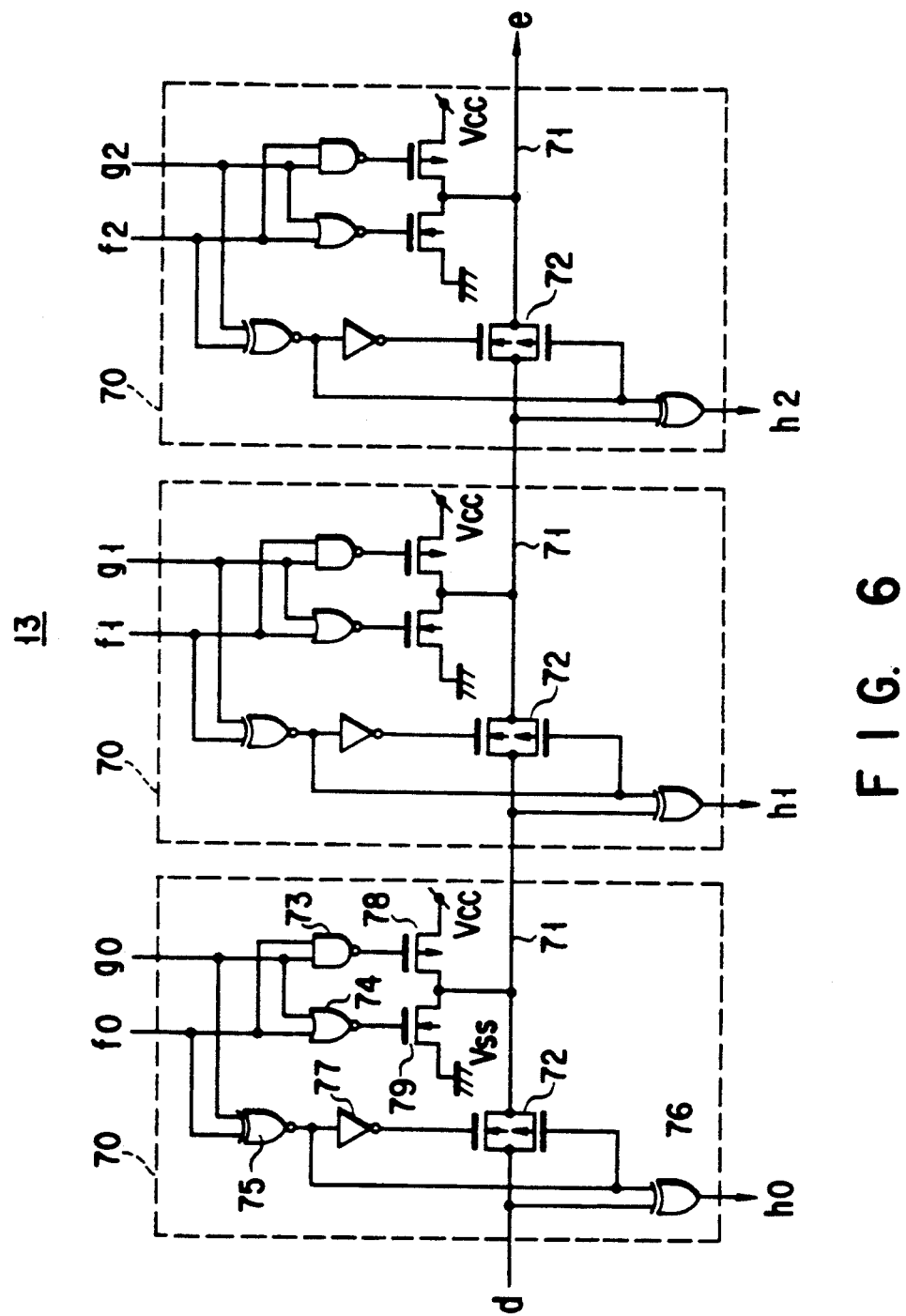
FIG. 6 is a circuit diagram showing the static Manchester-type adder circuit used as ALU 13 incorporated in the 3-bit adder of FIG. 5.

As is shown in FIG. 5, the 3-bit adder comprises two registers 11 and 12, an ALU 13, another register 14, a two-input AND circuit 15, two initializing signal output circuits 21 and 22, and two selection circuits 23 and 24. The first register 11 receives first 3-bit data a, and the second register 12 receives second 3-bit data b. The initializing signal output circuits 21 and 22 are designed to output an initializing signal in response to a clock signal CLK. The first selection circuit 23 is connected to receive data $f = (f0, f1, f2)$ from the first register 11 and also the initializing signal $i1 = (i10, i11, i12)$ from the first initializing signal output circuit 21. When the circuit 23 receives the signal i1, it outputs this signal i1. At all other times, the circuit 23 outputs the data f. The second selection circuit 24 is connected to receive data $g = (g0, g1, g2)$ from the second register 12 and also the initializing signal $i2 = (i20, i21, i22)$ from the first initializing signal output circuit 22. When the circuit 24 receives the signal i2, it outputs this signal i2. At all other times, the circuit 24 outputs the data g. As shown in FIG. 8, the selection circuit 23 comprises, for example, three two-input OR circuits 50. The selection circuit 24 is identical to the selection circuit 23. The ALU 13 is connected to receive data i from the first selection circuit 23 and data $k = (k0, k1, k2)$ from the second selection circuit 24. The ALU 13 is a Manchester-type adder, which is shown in FIG. 6 and is identical to the adder shown in FIG. 3. The adder receives a carry d supplied from a lower-digit adder (not shown) and outputs a carry e to a higher-digit adder (not shown, either). The third register 14 receives the data h output from the adder 13. The two-input AND circuit 15 receives the clock signal CLK and a operation control signal c. The output of the AND circuit 15 is input to the first register 11 and the second register 12.

Figure 7:
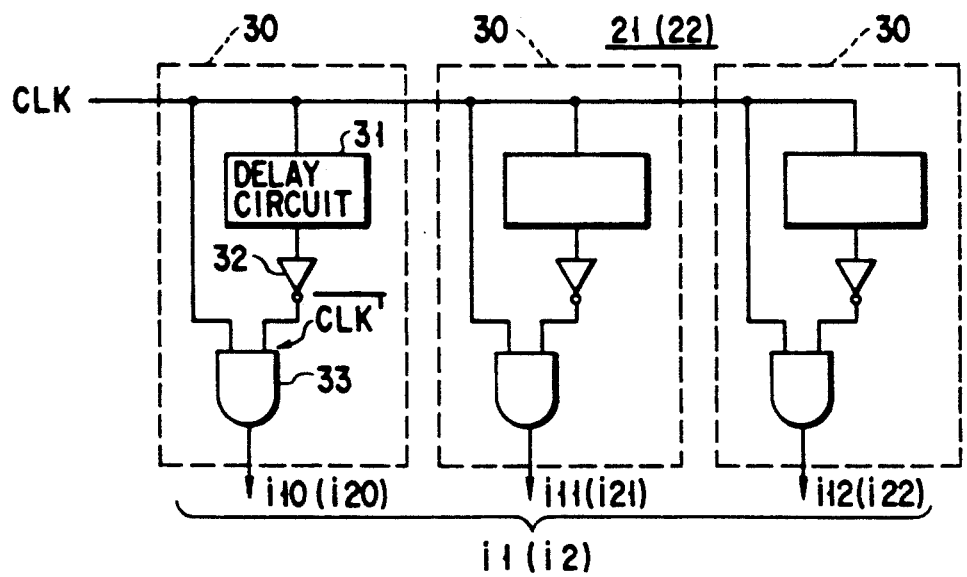
FIG. 7 is a circuit diagram showing one of the two initializing signal output circuits 21 and 22 which are identical and used in the 3-bit adder of FIG. 5.

One of the initializing signal output circuits 21 and 22, which are identical, will be described with reference to FIG. 7. As can be understood from FIG. 7, The initializing signal output circuit comprises three bit-initializing circuits 30. Each of the circuits 30 includes a delay circuit 31 for receiving the clock signal CLK, an inverter 32 for inverting the output of the delay circuit 31, and a two-input AND circuit 33 for receiving the clock signal CLK and the output of the inverter 32. The delay circuit 31 comprises a resistor and a capacitor or comprises chain-connected inverter, and has a delay time ta.

The selection circuit 23 comprises three OR circuits 50 as is shown in FIG. 8. The first, second and third OR gates 50 receive (f0, i10), (f1, i11) and (f2, i12), and output j0, j1 and j2, respectively.

The selection circuit 24 is identical to the selection circuit 23 except that the first, second and third OR gates received (g0, i20), (g1, i21) and (g2, i22), and output k0, k1 and k2, respectively.

FIG. 9 is a timing chart explaining how the 3-bit adder shown in FIG. 5 operates. In this figure, ta is the decode period during which the adder decodes an addition-instruction code to generate the operation control signal c, tb is the addition period during which the adder carries out addition, and tc is the setup period during which the third register 14 is set up to store the data h output by the adder 13.

As can be understood from FIG. 9, decoding the addition-instructing code is started at the leading edge of the clock signal CLK to render the control signal c active. The decoding period i.e., the time from the leading edge of the clock signal CLK until the start of the operation of the adder, is ta. In the bit-initializing circuits 30 (FIG. 7) of each initializing signal output circuit, the delay circuits 31 output a delayed clock signal CLK' upon lapse of the delay time ta (i.e., the decoding period). The inverter 32 of each circuit 30 inverts the delayed clock signal CLK', generating a delayed inverted clock signal $\overline{CLK'}$. The clock signal $\overline{CLK'}$ is input to the AND circuit 33, along with the clock signal CLK. The first, second and third AND circuit 33 generate one-shot pulses i10, i11, i12, respectively. As a result, the first initializing signal output circuit 21 outputs a first initializing signal i1 =(i10, i11, i12). Similarly, the second initializing signal output circuit 22 outputs a second initializing signal i2 =(i20, i21, i22). These signals 11 and i2 are input to the first selection circuit 23 and the second selection circuit 24, respectively. All bits of output data of the first and second selection circuits 23 and 24 become "1", whichever values the input 3-bit data f and the input 3-bit data g have. These output data of the selection circuits 23 and 24 are input, as dummy data, to the Manchester-type adder circuit 13 to initialize the adder. The carry lines 71 of the adder 13 are thereby initialized to "1."

At the trailing edge of the one-shot pulses, the selection circuits 23 and 24 select the 3-bit input data f and the 3-bit input data S, which are input to the Manchester-type adder 13. The adder 13 adds the data f and the data g. In this case, the carry lines 71 of the adder 13 transfer only "0," for the following reason.

In any one of the adder circuits 70 of the adder 13 (FIG. 6), the output of the NOR circuit 74 is "1" if the input data is (0, 0). The N-channel transistor 79 connected to the output of the NOR circuit 74 is turned on. Hence, "0" is output to the carry line 71, regardless of the carry supplied from the lower-digit adder circuit. On the other hand, if the input data is (1, 1), the output of the NAND circuit 73 is "0," and the P-channel transistor 78 connected to the output of the carry NAND circuit 73 is turned on. As a result, "1" is output to the carry line 71, regardless of the carry supplied from the lower-digit adder circuit. However, the carry has equivalently or substantially already been transferred to the upper-digit adder circuit since the carry line is initialized to "1." To the contrary, if the input data is (0, 1) or (1, 0), the output of the NOR gate 74 is "0," and that of the NAND circuit 73 is "1." In this case, the N-channel transistor 79 connected to the output of the NOR circuit 74 is turned off, whereas the P-channel transistor 78 connected to the the output of the NAND circuit 73 is turned off. The output of the exclusive NOR circuit 75 is therefore "0," and the CMOS transfer gate 72 is turned on. As a result, the carry from the lower-digit adder circuit is transferred to the higher-digit adder circuit. (In other words, the carry to the higher-digit adder circuit depends on the carry supplied from the lower-digit adder circuit.) However, also in this case, since the carry line has been initialized to "1," when the carry is "1", the carry "1" has been equivalently already transferred to the upper-digit adder circuit. Thus, the carry transfer is substantially performed only for the carry "0".

As is understood from the above, according to the present invention, it suffices to transfer a carry of only one value, "0" or "1" (in this embodiment, value "0" only). Thus, by constructing the adder so as to transfer the carry of only one value at high speed, the adder 13 can operate as a whole at so high a speed as the operating speed of a dynamic adder. To transfer the carry faster, it is sufficient to use a sense inverter or the like for driving the carry lines 71. Alternatively, to transfer a carry of, for example, "0" faster, a large-capacity N-channel transistors can be used as CMOS transfer gates 72.

Figure 10:
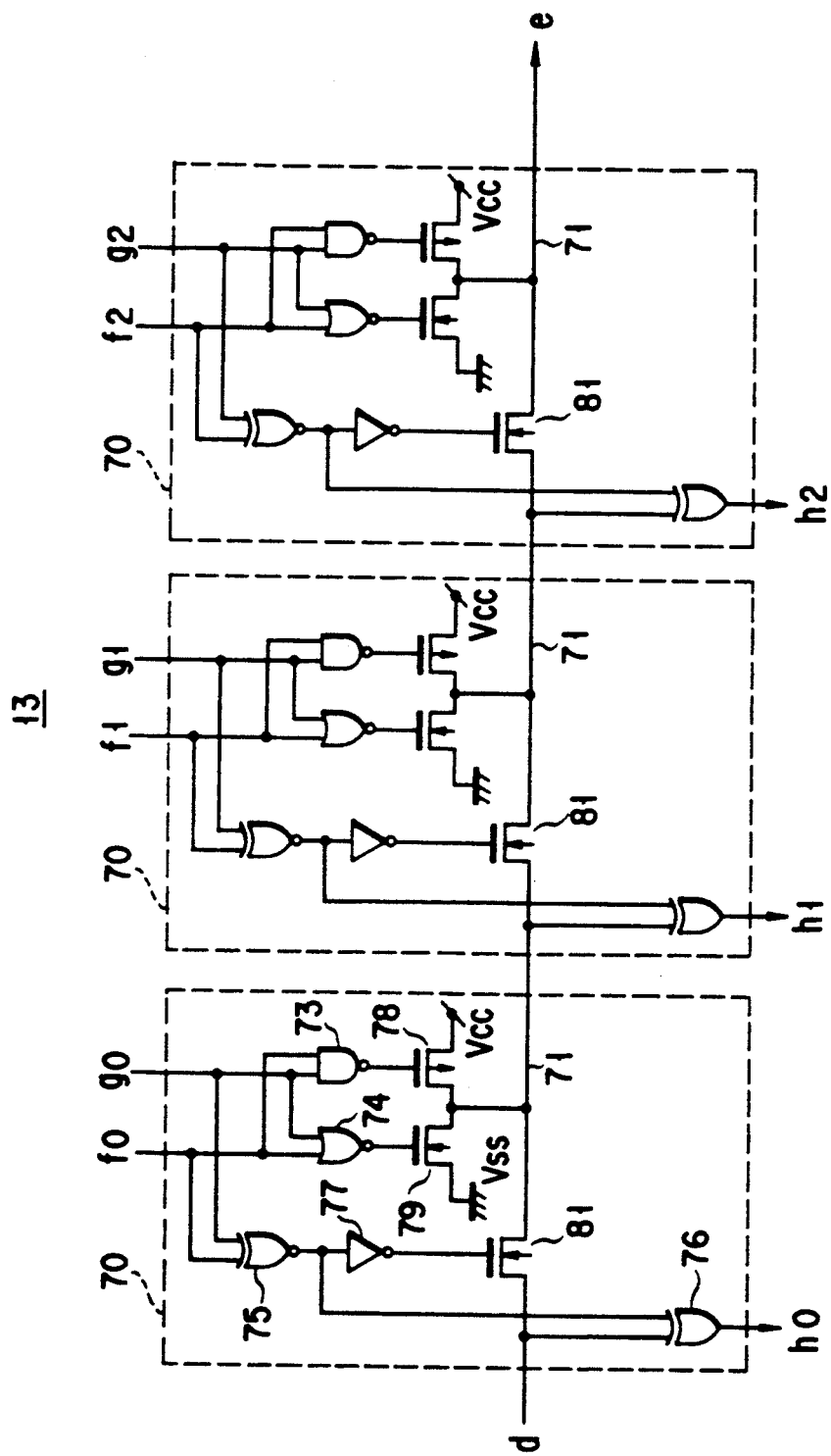
FIG. 10 is a block diagram of a modification of the static Manchester-type adder circuit shown in FIG. 6, in which N-channel transistor 81 are used in place of the transfer gates 72.
Figure 11:
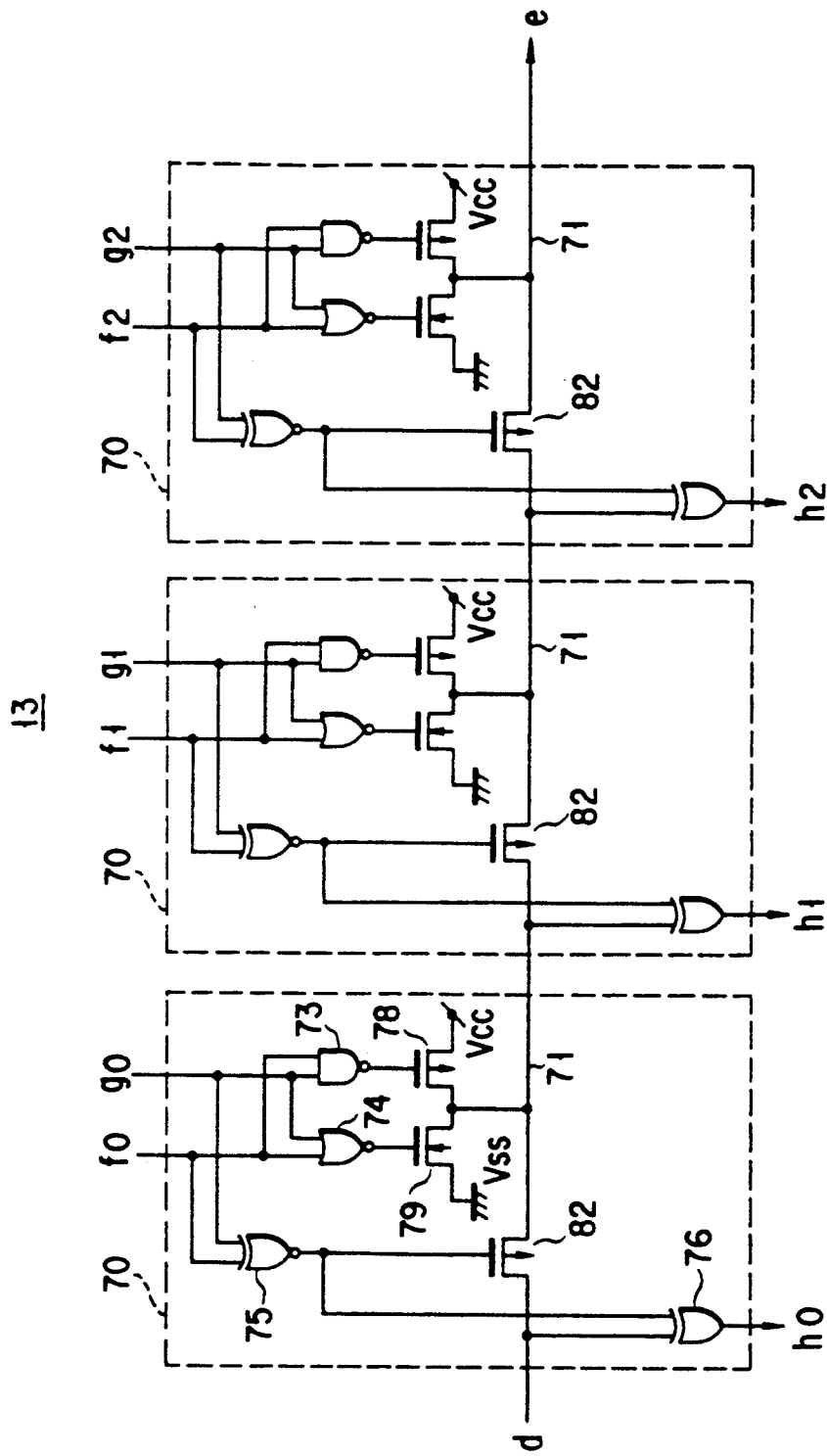
FIG. 11 is a block diagram of a modification of the static Manchester-type adder shown in FIG. 6, in which P-channel transistor 82 is used in place of the transfer gates 72.

Since it suffices to transfer a carry of only one value, "0" or "1", the COMOS transfer gate 72 (FIG. 6) comprising a pair of P channel transistor and N channel transistor in each carry line 71 can be replaced by only one N-channel transistor in the case where the carries b to transfer have the value of only "0," or only one P-channel transistor in the case where the carries to transfer have the value of only "1." FIG. 10 shows a modification of the static adder circuit of FIG. 6, in which N-channel transistors 81 are used in place of the transfer gates 72. FIG. 11 is a block diagram of a modification of the static adder circuit shown in FIG. 6, in which P-channel transistor 82 is used in place of the transfer gates 72. Obviously, the adder circuits shown in FIGS. 10 and 11 comprise less components than the adder circuit of FIG. 6.

The initializing signal output circuits 21 and 22 output an initializing signal in response to predetermined data of "1" or "0." According to the present invention, the circuits 21 and 22 may be replaced by circuits which are designed to generate an initializing signal in response to predetermined data which is a combination of "1" and "0."

FIG. 12 shows part of another adder according to this invention, which is designed to add two 4-bit data items and which comprises 4-bit Manchester-type adder circuits 40 each having a carry line 41, inverter circuits 42 (i.e., drive circuits) connecting the carry lines 41 of the adder circuits 40 in series, and initializing signal output circuits 43 and 44. Predetermined data of, for example, "1" is input to the circuit 43 connected to the Manchester-type adder circuit 40 for the 4 bits of the lower-digit, and predetermined data of, for example, "0" is input to the circuit 44 connected to the Manchester-type adder circuit 40 for the 4 bits of the higher-digit.

As has been described above, the adder according to this invention can operate as fast as a dynamic adder, and can perform addition during the clock cycle as a static dynamic adder, serving to increase the operating frequency of the system in which it is incorporated. Hence, the adder of this invention is suitable for use in the ALU or address adder of a microprocessor.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An adder comprising:
   a Manchester-type adder circuit including a plurality of adder circuits, each having a carry line and each designed to receive corresponding bits of two input data items which are to be added, the carry lines of said adder circuits being connected in series;
   a plurality of initializing signal output circuits for generating initializing signals in response to predetermined data supplied before said Manchester-type adder circuit starts performing each operation, thereby to initialize said adder circuits; and
   a plurality of selection circuits each receiving input data and an initializing signal supplied from one of said initializing signal output circuits, selecting and outputting the initializing signal upon receipt of the initializing signal to said plurality of adder circuits, and selecting and outputting the input data at other times to said plurality of adder circuits.

2. An adder comprising:
   a first register for receiving a first input data;
   a second register for receiving a second input data;
   a first initializing signal output circuit for generating a first initializing signal in response to a clock input;
   a second initializing signal output circuit for generating a second initializing signal in response to the clock input;
   a first selection circuit for receiving the first input data and the first initializing signal supplied from said first register and said first initializing signal output circuit, respectively, to select and output the first initializing signal upon receipt of the first initializing signal and to select and output the first input data at other times;
   a second selection circuit for receiving the second input data and the second initializing signal supplied from said second register and said second initializing signal output circuit, respectively, to select and output the second initializing signal upon receipt of the second initializing signal and to select and output the second input data at other times;
   a Manchester-type adder circuit for receiving and adding the first data and the second data selected and output by said first and second selector circuits, respectively; and
   a third register for receiving data output by said Manchester-type adder circuit.

3. The adder according to claim 2, wherein said first initializing signal output circuit comprises a plurality of bit-initializing circuits provided for the data bits output by said first register, said second initializing signal output circuit comprises a plurality of bit-initializing circuits provided for the data bits output by said second register, said first initializing signal output circuit comprises a delay circuit and a two-input AND circuit for receiving an output of the delay circuit, and said second initializing signal output circuit comprises a delay circuit and a two-input AND circuit for receiving an output of the delay circuit.

* * * * *